(12) United States Patent
Caplan

(10) Patent No.: US 9,563,697 B1
(45) Date of Patent: Feb. 7, 2017

(54) CALCULATING DIFFERENCES BETWEEN DATASETS HAVING DIFFERING NUMBERS OF PARTITIONS

(71) Applicant: Amazon Technologies, Inc., Reno, NV (US)

(72) Inventor: Joshua Elliot Caplan, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 522 days.

(21) Appl. No.: 14/187,455

(22) Filed: Feb. 24, 2014

(51) Int. Cl.
G07F 7/00 (2006.01)
G06F 17/30 (2006.01)

(52) U.S. Cl.
CPC .................. *G06F 17/3071* (2013.01)

(58) Field of Classification Search
CPC .................................................. G06F 17/3071
See application file for complete search history.

(56) References Cited

U.S. PATENT DOCUMENTS

| | | | |
|---|---|---|---|
| 8,190,610 B2 * | 5/2012 | Dasdan | G06F 17/30584 707/737 |
| 8,555,265 B2 | 10/2013 | Chambers et al. | |
| 2011/0295855 A1 | 12/2011 | Wang et al. | |
| 2012/0254193 A1 | 10/2012 | Chattopadhyay et al. | |
| 2012/0278323 A1 | 11/2012 | Chattopadhyay et al. | |
| 2012/0284727 A1 | 11/2012 | Kodialam et al. | |
| 2013/0290972 A1 | 10/2013 | Cherkasova et al. | |
| 2013/0318129 A1 * | 11/2013 | Vingralek | G06F 17/30595 707/803 |
| 2014/0279883 A1 * | 9/2014 | Kostenko | G06F 9/5061 707/618 |
| 2014/0324861 A1 * | 10/2014 | Ray | G06F 17/30442 707/737 |

FOREIGN PATENT DOCUMENTS

WO 2014019980 2/2014

OTHER PUBLICATIONS

Jens Dorre, et al., "Static Type Checking of Hadoop MapReduce Programs", Jun. 8, 2011, pp. 17-24.
Roberto Congiu's blog, "Joins in Hadoop using CompositeInputFormat", Robert Congiu, Jun. 7, 2009, pp. 1-3.

* cited by examiner

*Primary Examiner* — Sherief Badawi
*Assistant Examiner* — Lahcen Ennaji
(74) *Attorney, Agent, or Firm* — Robert C. Kowert; Meyertons, Hood, Kivlin, Kowert & Goetzel, P.C.

(57) ABSTRACT

Two massive databases, having differing numbers of partitions within a MapReduce process, may be compared within a map-stage of the MapReduce process without the need for a reduce stage of the MapReduce process. Custom input functions may be used to coordinate the reading of data from the partitions. By taking advantage of the fact that the database are divided and sorted in a consistent manner, the input functions may coordinate the matching of records from the two databases for use within a MapReduce process. By taking advantage of the consistent grouping and sorting of the data within the partitions, the map stage of the MapReduce process may generate includes the desired final data (e.g., the differences between the two databases) without the need to transfer partitioned intermediate results between the map stage and a reduce stage of the MapReduce process.

20 Claims, 8 Drawing Sheets

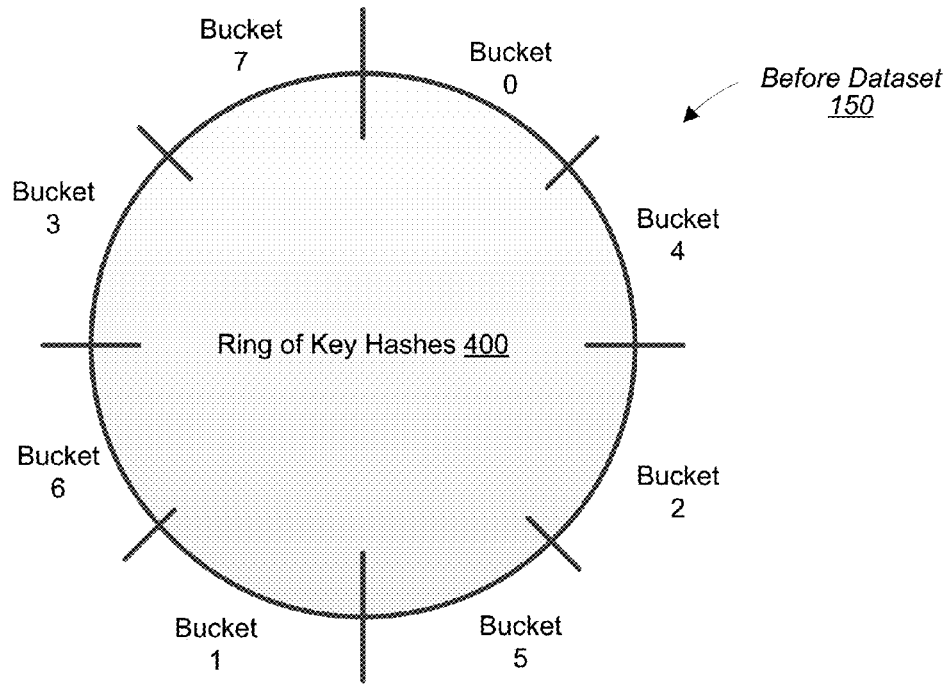
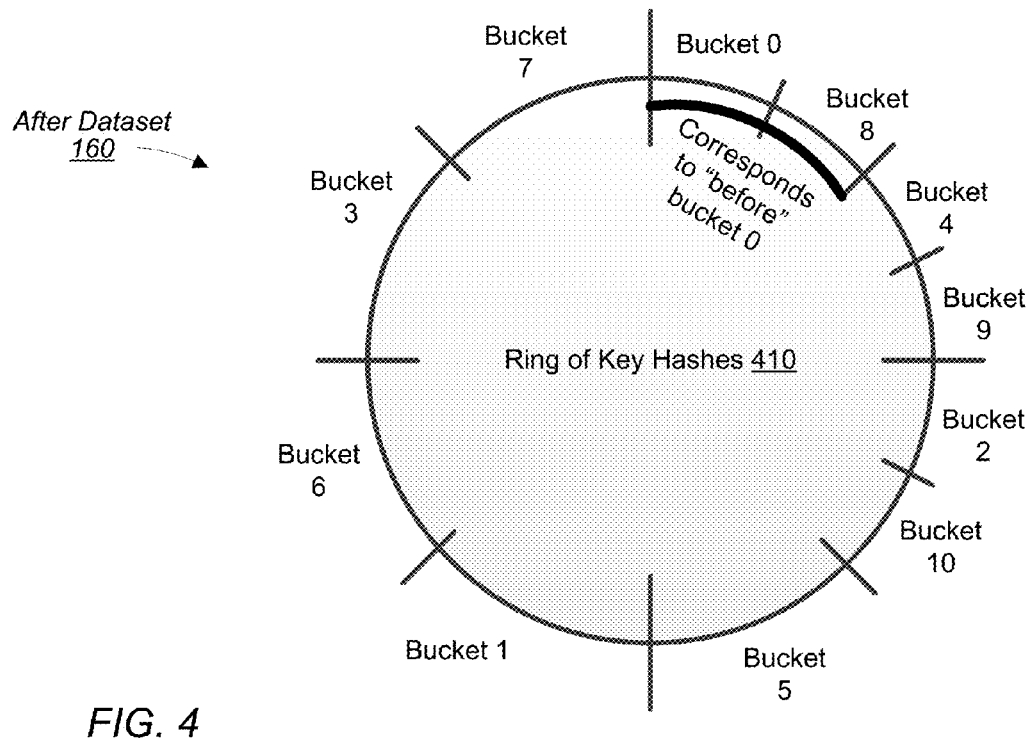
FIG. 4

CALCULATING DIFFERENCES BETWEEN DATASETS HAVING DIFFERING NUMBERS OF PARTITIONS

BACKGROUND

Many companies and other organizations operate computer networks that interconnect numerous computing systems to support their operations, such as with the computing systems being co-located or instead located in multiple distinct geographical locations (e.g., connected via one or more private or public intermediate networks). For example, data centers housing significant numbers of interconnected computing systems have become commonplace, such as private data centers that are operated by and on behalf of a single organization and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. As the scale and scope of typical data centers has increased, the tasks of provisioning, administering, and managing the physical computing resources have become increasingly complicated.

Examples of such large-scale systems include online merchants, internet service providers, online businesses such as photo processing services, corporate networks, cloud computing services, web-based hosting services, etc. These entities may maintain computing resources in the form of large numbers of computing devices (e.g., thousands of hosts) which are hosted in geographically separate locations and which are configured to process large quantities (e.g., millions) of transactions daily or even hourly. Such large-scale systems may collect vast amounts of data that require processing.

One conventional approach to process data is the MapReduce model for distributed, parallel computing. In a MapReduce system, a large set of data may be split into smaller chunks, and the smaller chunks may be distributed to multiple compute nodes for an initial "map" stage of processing. Multiple nodes may also carry out a second "reduce" stage of processing based on the results of the map stage. The results from the map stage may be "shuffled" to other nodes to use as input for the reduce stage. In other words, the intermediate results may be reorganized and grouped differently for the reduce stage and may be transferred across a network to the reduce nodes. The use of network resources in this manner may be expensive, and the shuffle operation may be time-consuming.

Within a MapReduce implementation most computations involve applying a user-specified map operation to each logical "record" in the input in order to compute a set of intermediate key/value pairs, and then applying a user-specified reduce operation to all the values that shared the same key. Thus, the MapReduce computation takes a set of input key/value pairs and produces a set of output key/value pairs. The user of the MapReduce library expresses the computation as two functions: a map function and reduce function. The user-written map function receives a pair of input key-values pairs and produces a set of intermediate key/value pairs. The reduce function, also written by the user, receives and merges together the intermediate values Although Java™ code is commonly used with MapReduce, virtually any programming language may be used to implement the map and reduce functions.

BRIEF DESCRIPTION OF THE DRAWINGS

FIG. 4 is a block diagram illustrating a logical view of two datasets partitioned into differing numbers of partitions.

Figure 1:
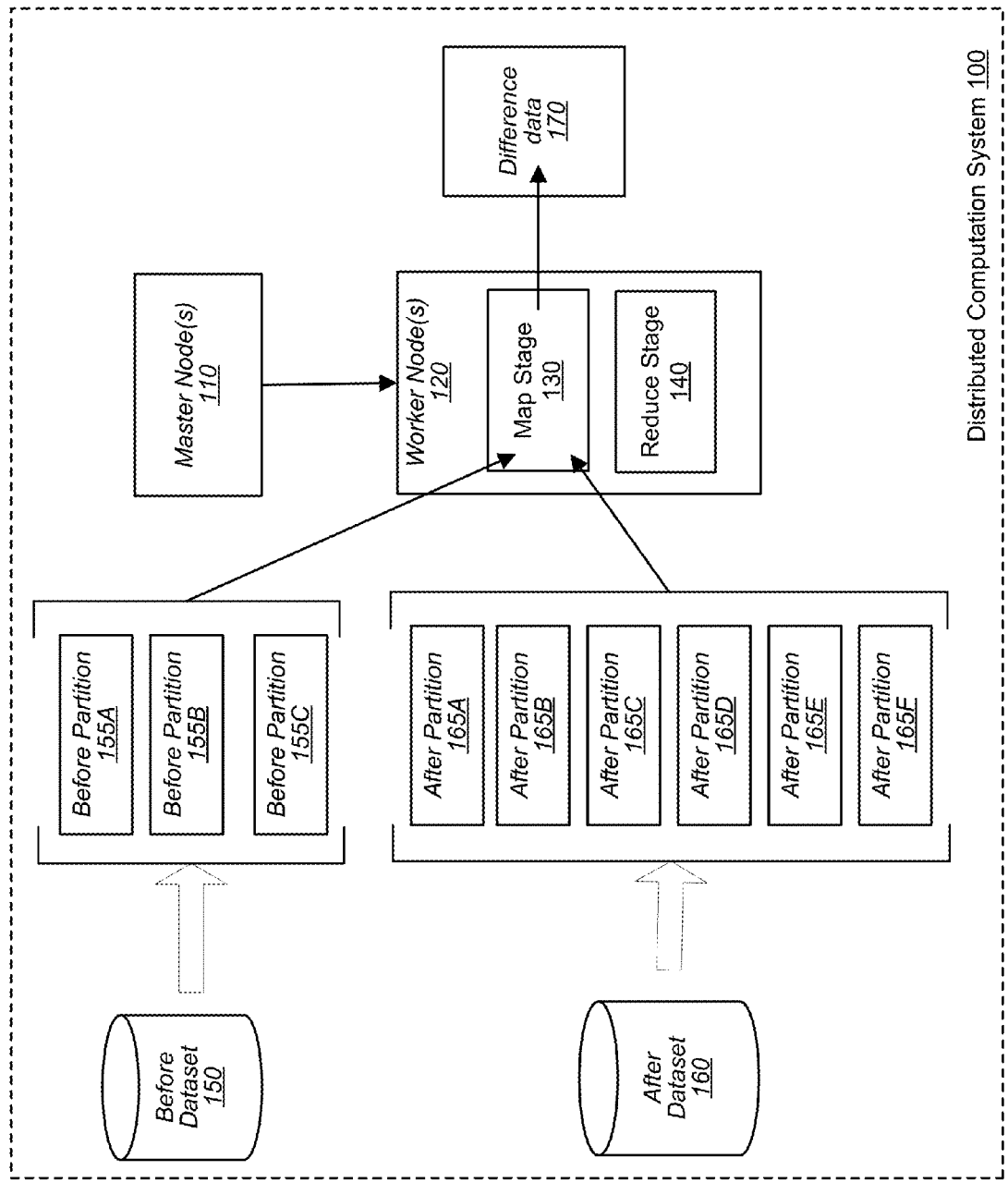
FIG. 1 is a logical block diagram illustrating an example system for calculating differences between two datasets having differing numbers of partitions within a distributed MapReduce computation system, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended examples. The headings used herein are for organizational purposes only and are not meant to be used to limit the scope of the description or the examples. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for performing MapReduce comparison of massive databases having differing numbers of partitions are described. A MapReduce process may be used to determine differences between two databases even when those database are split into differing numbers of partitions without the need for a reduce stage of the overall MapReduce process. According to some embodiments, custom input functions may be used to coordinate the reading of data from the various partitions. By taking advantage of the fact that the databases are divided and sorted in a consistent manner, the input functions may coordinate the matching of records from the two databases for use within the MapReduce process. Furthermore, by taking advantage of the consistent grouping and sorting of the partitions, the use of network resources may be minimized or eliminated altogether since, in some embodiments, the output from the map stage of the MapReduce process includes the desired results data (e.g., differences between the two database) thereby obviating the need to transfer partitioned intermediate results between the map stage and the reduce stage.

MapReduce

A typical MapReduce program includes a map( ) function (or method or procedure) that may perform various forms of processing, such as filtering or sorting and a reduce( ) function that may perform secondary operations (such as summations, aggregations, etc.). A system utilizing a MapReduce process (such as a MapReduce infrastructure or framework) may utilize multiple servers, hosts and/or worker nodes, executing the various tasks in parallel.

During the map stage of a MapReduce process, a master node may divide the input data into data subsets and distribute them to individual worker nodes. In some embodiments, a worker node may also sub-divide the data and utilize additional worker nodes, thus creating a multi-level processing structure. The worker nodes process the data subsets and pass the resulting output data to the master node (or the previous worker node).

Thus, a MapReduce process may allow for distributed processing of the map and reduce operations. Provided that each map operation is independent of the others, all map functions can be executed in parallel. Similarly, the reduce stage may also be performed in parallel.

When using a MapReduce process to calculate differences between two datasets, a map stage within the overall MapReduce program may compare an earlier dataset with a later dataset. In some embodiments, the datasets may represent two versions of the same data. For instance, the later dataset may include additions, deletions and changes to the data as compared to the earlier dataset. Each dataset may include sets of records and each record may include a key-value pair. Furthermore, each dataset may be sorted by the keys in the same way. In other words, both datasets are sorted in the same manner using the same keys. The two datasets may each be split into multiple partitions, such as to enable parallel processing by multiple computers (e.g., worker nodes). For example, the input datasets may be split into logical partitions (sometimes called input splits) based on the total size (e.g., in terms of bytes) of the input files. However, in many embodiments, record boundaries may be respected and used to determine the actual division between two partitions or splits.

In some embodiments, such a comparison may be performed within the map stage of a MapReduce process, without the need for any reduce stage. For instance, comparing two massive databases (e.g., datasets) may be performed within the map stage of a map-side join within a MapReduce process, according to some embodiments. By imposing partitioning and sorting restrictions on the input datasets, as will be discussed in more detail below, corresponding partitions from each dataset may be compared by iterating through them simultaneously and presenting the map tasks of the MapReduce process with pairs of records (e.g., one from each dataset). The map tasks of the MapReduce process then generate the output data representing the differences between the two databases. After the differences between the two databases have been determined (e.g., as the output of the map stage), a reduce stage may be used to apply additional summary, aggregation, or other analysis to the difference data obtained during the map stage, in some embodiments.

Comparing two massive databases, as described herein, may take advantage of certain properties of the MapReduce process. For example, the partitioning scheme (such as a hash function) of the MapReduce process may be consistent across runs. Thus, the partitions from a previous run (e.g., a previous version of the database) may be utilized in a subsequent run without repartitioning the previous version of the database). Additionally, the output from the MapReduce process may generally be sorted internally in a consistent manner and such sorting may be used to aid in determining differences (e.g., added or deleted records) between the two databases, as described herein.

FIG. 1 illustrates an example system environment for performing MapReduce-based comparison of two massive databases having differing numbers of partitions, according to one embodiment. The example system environment may implement a distributed computation system 100. The distributed computation system 100 may include one or more master nodes 110 and one or more worker nodes 120. The master node(s) 110 may represent one or more coordinator processes that coordinate computations performed by the worker nodes 120. The worker nodes may also be referred to herein as "worker hosts," "workers," or "hosts." The distributed computation system 100 may use one or more networks or interconnections to couple the various components. Elements of the distributed computation system 100 may be located in any suitable location relative to one another, from being virtual compute instances hosted on the same computing hardware to being different physical compute instances hosted in the same data center to being geographically remote. In some embodiments, the master node(s) 110 and worker nodes 120 may implement a MapReduce architecture in which the worker nodes perform similar tasks concurrently under the direction of the master node(s). However, it is contemplated that the distributed computation system 100 may implement other types of distributed computation architectures instead of or in addition to MapReduce.

Using the distributed computation system 100, a set of before partitions 155, such as before partitions 155A-155C may be compared to a set of after partitions 165, such as after Partitions 165A-165F by the worker nodes 120 to produce a set of difference data 170. For example, in one embodiment, before partitions 155 may represent multiple partitions of before dataset 150 and after partitions 165 may represent multiple partitions of after dataset 160. Before dataset 150 and after dataset 160 may represent two different databases or may represent two different versions of the same database, according to different embodiments. For instance, in one embodiment, before dataset 150 and after dataset 160 may represent two different versions of a database that is updated daily and the two versions are being compared to determine any differences that may have occurred between two different days.

Before dataset 150 may be split into one or more of partitions, such as before partitions 155A, 155B and 155C. Similarly, after dataset 160 may be split into one or more partitions, such as after partitions 165A, 165B, 165C, 165D, 165E, and 165F. As shown in FIG. 1, the two databases may be split into differing numbers of partitions. For example, the database may have grown too large to be processed efficiently with the same number of partitions used previously, according to some embodiments. Thus, one database may be split into a greater number of partitions than the other. In some embodiments, one of the databases may be split into a number of partitions that is an even multiple of the other. In other words, as shown in FIG. 1, according to one embodiment, after dataset 160 may be split into twice the number of partitions as before dataset 150. In other embodiments, however, other multiple, or even uneven multiples may be used.

Also, while described herein mainly in regard to a later version of a database being split into more partitions than a previous version of the database, is some embodiments, a later version of a database may be split into fewer (e.g., half as many) partition than a previous version (e.g., when the database is shrinking rather than growing over time). In other embodiments, the two databases being compared may not be different versions of the same database, but instead may be any two databases with comparable data.

While described herein mainly in terms of comparing an earlier and a later dataset, in general, the techniques described herein may be applied to virtually any sort of MapReduce-based processing of any two dataset that include the same keyspace and that are sorted (and partitioned) in the same manner, according to various embodiments. Additionally, virtually any sort of data may be used for the keys and/or values described herein. For example, in some embodiments, the keys may be numeric (e.g., IDs, hash values, etc.) while in other embodiments, the keys may be textual or string data. Similarly the values associated with the keys may be numeric, textual, or a combination of each. Furthermore, in some embodiments, the keys and/or values may be data structures including multiple fields of differing data types.

The datasets may be split into partitions on any suitable basis. For example, partition boundaries may be based on the boundaries between individual records, individual lines of data, etc. An individual partition may include elements of input data, such as related items or families of items, intended to be processed together by a single worker node. Although a particular number of partitions are illustrated in FIG. 1 for purposes of example, it is contemplated that any suitable number of partitions of input data may be processed using the distributed computation system 100.

In general one or more of the before partitions 155 and two or more of the after partitions 165 may be assigned to each of the worker nodes 120. The worker node may then compare the partitions to determine differences between the two databases. Thus, a worker node may be assigned before partitions and after partitions that correspond to each other. For example, a single before partition may include records for a certain set of keys and two after partitions may also include records for the same (or at least similar) set of keys. Thus, the set of keys in one before partition may overlap the keys in two or more after partitions, according to some embodiments. In other words, any after partition that includes a key that is also in a particular before partition will only include keys that are also in that particular before partition (or keys that were added to the dataset which would have been hashed to that before partition had they existed in the before dataset). A worker node may be assigned a single partition from the dataset that was split into fewer partitions as well as multiple partitions from the dataset that was split into a greater number of partitions.

The assignment of individual partitions to individual worker nodes as shown in FIG. 1 is presented for purposes of example and illustration; it is contemplated that any suitable assignment of individual partitions to individual worker nodes may be used with the distributed computation system 100.

In one embodiment, the master node(s) 110 may provide individual partition(s) to individual worker nodes, e.g., by performing aspects of the partitioning of the datasets and/or aspects of the assignment of individual partitions to individual worker nodes. In one embodiment, the master node(s) 110 may send data indicative of partition assignments to individual worker nodes, and each worker node may acquire its partitions using any suitable technique. For example, a worker node may read a portion of the data from one or more files or storage locations in one or more storage devices that are accessible to the worker nodes, e.g., over a network. Alternatively, the master node(s) 110 may directly send the relevant partition(s) to individual worker nodes using a network. In various embodiments, the partition(s) to be processed using a particular worker node may be loaded into memory at the particular worker node either partially or entirely before the processing of the partition(s) is initiated.

Each of the worker nodes 120 may perform any suitable processing tasks to generate the difference data 170. As shown in FIG. 1, the worker nodes may implement a map stage 130 of an overall MapReduce process to compare the partitions and generate difference data 170 indicating any differences between the partitions. In one embodiment, the processing tasks implemented using the worker nodes 120 may be provided by the master node(s) 110, e.g., by sending program code to the worker nodes or instructing the worker nodes to load the program code from one or more storage locations. At least a portion of the processing tasks performed by the worker nodes 120 may be performed concurrently, i.e., in parallel relative to each other. In some embodiments, each of the worker nodes 120 may perform similar tasks and/or implement similar algorithms to process its partition(s) of the input data. As a result of the processing of the partitions, each of the worker nodes 120 may produce difference data 170. As they are produced by the worker nodes 120, the difference data 170 may be stored in one or more storage locations on one or more storage devices that are accessible to the worker nodes. The difference data 170 may also be referred to as final output data. In one embodiment, the difference data 170 may be further processed As will be described in greater detail below, the distributed computation system 100 may implement a MapReduce system in which the use of network resources is minimized during the processing of the worker nodes 120. The computation performed by each of the worker nodes 120 may include multiple stages of computation, such as a map stage 130 and a reduce stage 140.

In one embodiment, the map stage may include any computation(s) to generate intermediate output, such as difference data 170, based on the input partitions. Contrary to conventional MapReduce implementations, the intermediate output may represent the final desired output (e.g., the difference data 170) without the need for a reduce stage 140. Accordingly, the distributed computation system 100 may avoid the time and expense of re-partitioning and network data transfer associated with a conventional shuffle from the map stage to the reduce stage.

It is contemplated that the distributed computation system 100 may include additional components not shown, fewer components than shown, or different combinations, configurations, or quantities of the components shown. It is contemplated that any suitable number of worker nodes may be used in conjunction with the distributed computation system 100. Although one master node 110 is illustrated for purposes of example, it is contemplated that any suitable number of master nodes 110 may be used in conjunction with the distributed computation system 100. In some embodiments, any of the worker node(s) 120 and/or master node(s) 110 may be implemented as virtual compute instances or as physical compute instances. One or more virtual compute instances may be implemented by the example computing device 3000 illustrated in FIG. 5. The distributed computation system 100 may include one or more computing devices, any of which may also be implemented by the example computing device 3000 illustrated in FIG. 5. In various embodiments, the functionality of the different components of the distributed computation system 100 may be provided by the same computing device or by different computing devices. If any of the various components are implemented using different computing devices, then the respective computing devices may be communicatively coupled, e.g., via one or more networks. Each component of the distributed computation system 100 may represent any combination of software and hardware usable to perform their respective functions, as discussed as follows.

In one embodiment, the distributed computation system 100 may manage the allocation of network-accessible resources. Networks set up by an entity such as a company or a public sector organization to provide one or more services (such as various types of cloud-based computing or storage) accessible via the Internet and/or other networks to a distributed set of clients may be termed provider networks. A provider network may include numerous data centers hosting various resource pools, such as collections of physical and/or virtualized computer servers, storage devices, networking equipment and the like, that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like.

In one embodiment, operators of provider networks may implement a flexible set of resource reservation, control, and access interfaces for their clients. For example, a provider network may implement a programmatic resource reservation interface (e.g., via a web site or a set of web pages) that allows clients to learn about, select, purchase access to, and/or reserve resource instances. In one embodiment, resources may be reserved on behalf of clients using a client-accessible service that implements the distributed computation system 100. According to one such embodiment, the distributed computation system 100 in such an environment may receive a specification of one or more tasks to be performed for a client, along with a set of input data or an indication of a source of input data to be used by the task(s). In response, the distributed computation system 100 may determine an execution plan for implementing the task(s) using one or more resources of a selected resource pool of the provider network. In one embodiment, the resource pool may be automatically selected based on the anticipated computational needs of the various tasks. In one embodiment, the resource pool may be selected based on a specific resource request or reservation submitted by the client. The distributed computation system 100 may schedule an execution of the task(s) using the selected resources.

In one embodiment, the client may use one or more suitable interfaces (such as one or more web pages, an application programming interface [API], or a command-line interface [CLI]) to specify the task(s) to be implemented, the input data set, the computing resources to be used, and/or a time at which the task(s) should be initiated. In one embodiment, the client may be able to view the current execution status of the task(s) using the interface(s). In one embodiment, additional information about executed tasks may be available via the interface(s), such as program output, error logs, exception logs, and so on.

Dataset Comparison

Figure 2:
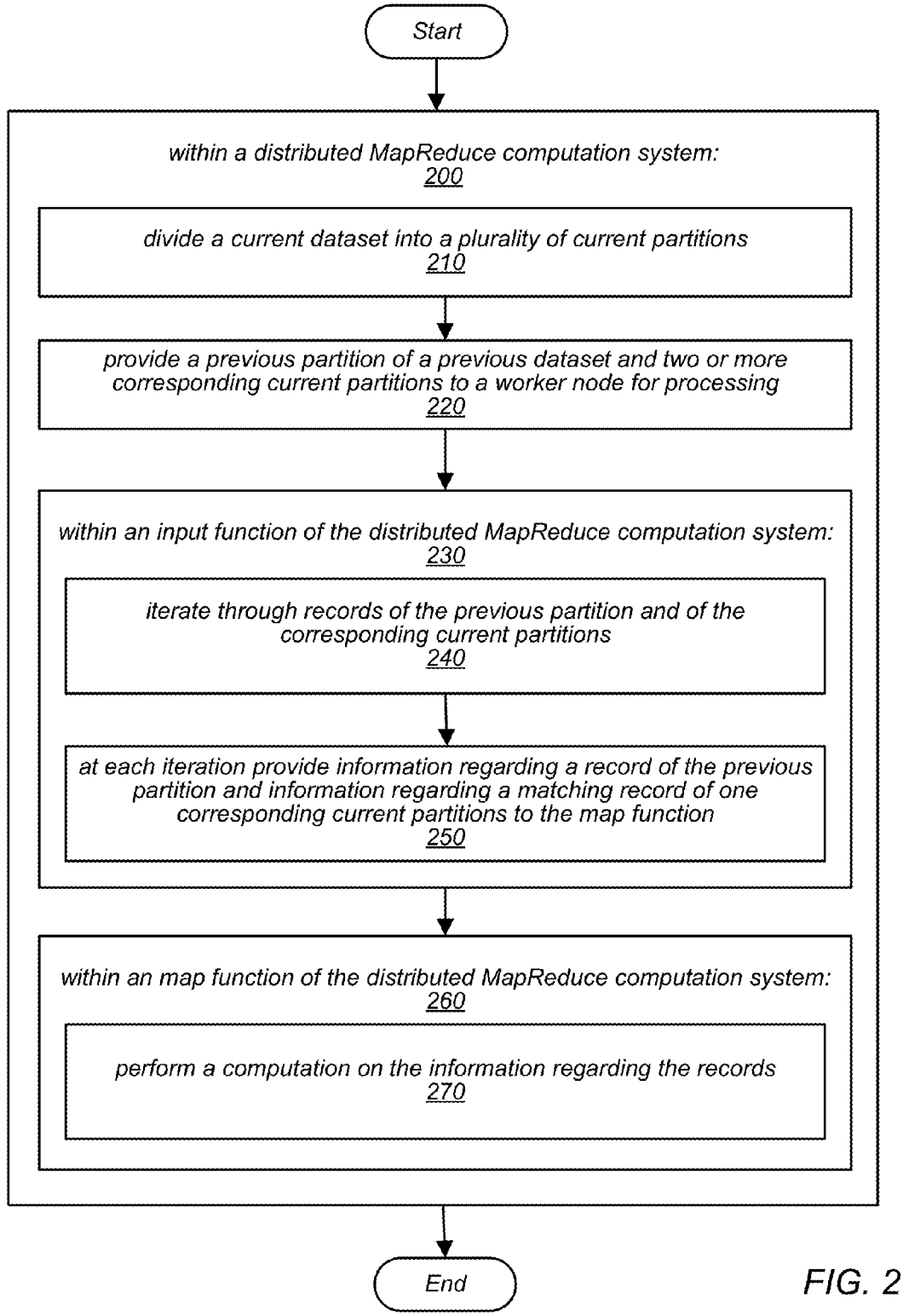
FIG. 2 is a flowchart illustrating one embodiment of a method for processing two dataset with differing numbers of partitions within a distributed MapReduce computation system, as described herein.

FIG. 2 is a flowchart illustrating one embodiment of a method for processing two dataset with differing numbers of partitions within a MapReduce process, as described herein. As shown in block 600, the processing of the two datasets may occur within a distributed MapReduce computation system, such as within distributed computation system 100, described above. For ease of discussion, a previous dataset and a current dataset will be used to describe the techniques illustrated in FIG. 2. However, in other embodiments, other types of dataset (and/or databases) may be used that may not be a previous and current dataset. In general any two datasets having differing numbers of partitions may be processed within a distributed MapReduce computation system, according to various embodiments.

As shown in block 210, a current dataset may be divided into a plurality of current partitions. For example, after dataset 150 may be divided (e.g., split) into a plurality of partitions (or splits), such as before partitions 155A, 155B and 155C. In some embodiments, master node 110 may be configured to split the datasets into multiple partitions and may utilize a splitter function to perform the division of the datasets into partitions.

A previous partition of a previous dataset and two or more corresponding current partitions may be provided to a worker node for processing, as shown in block 220. For example, in one embodiment, before partition 155A and after partitions 165A and 165B may be provided to worker node 120 for processing. According to one embodiment, one of the datasets (e.g., the current dataset) may be divided into more partitions (e.g., twice, three times, four times as many, etc.) as the other database (e.g., the previous database). For instance, both datasets may represent different versions of the same database and the database may have grown in size between the two versions and therefore the current version may be divided into more partitions, such as to achieve improved efficiency within the distributed MapReduce computation system.

It should be noted however, that either of the two datasets may be the larger of the two and may therefore be divided into the larger number of partitions. For example, the database may have shrunk in size between the two versions and the later (or current) dataset may be divided into a smaller number (e.g., one half, one third, etc.) of partitions as compared to the earlier or previous dataset.

In general, within a distributed MapReduce computation system, any sort of processing may be performed on records of the two datasets. For example, one or more worker nodes(s) 120 may be configured to perform a comparison of the two datasets may distributing the partitions of the datasets to individual ones of the work nodes and having each worker node compare records from the different partitions to determine any differences between the two datasets.

As shown in block 230 and 240, an input function of the distributed MapReduce computation system may iterate through records of the previous partition and of the corresponding current partitions. According to one embodiment, the input function may open and read files containing the records of the partitions and may iterate through the records determining which records from the multiple current partitions. For instance, the dataset may be partitioned according to partitioning schemes which ensure that the record within the partitions are grouped and/or sorted consistently, according to some embodiments. Thus, the input function may be configured to determine, according to the partitioning scheme and/or based upon the sort order, which current partition includes a record corresponding to a record included in one of the previous partitions.

Records from the two datasets may correspond according to different manners or mechanisms in different embodiments. For example, in one embodiment, each record may include (and may be sorted by) a key and two records having the same key may correspond. Additionally, the records may be sorted by a key and the input function may be configured to utilize the key to determine not only which current partition should contain a record corresponding to a record in a previous partition, but also whether any records were added or deleted between the two datasets.

The input function may, at each iteration of the records (i.e., at each current record), provide information regarding a record of the previous partition and information regarding a matching record of one of the corresponding current partitions to the map function of the distributed MapReduce computation system, as shown in block 250. For example, each record may include a key and a value pair and the input function may provide the key and the two values (e.g., one from each dataset) to the map function for processing (e.g., comparison). The exact manner and format of how the input function may provide the information regarding the records may vary from embodiment to embodiment and in general any suitable method and/or format may be used to convey whatever information regarding the records is required by the map function.

Subsequently, the map function of the distributed MapReduce computation system may perform a computation on the information regarding the records, as shown in blocks 260 and 270. For instance, in one embodiment, the map function may compare the information regarding the records to determine if any difference exists between the two records and may generate difference data, such as difference data 170, indicating (or describing) any determined difference. In other embodiments, the map function may perform different or other processing or computations on the information regarding the records.

Figure 3:
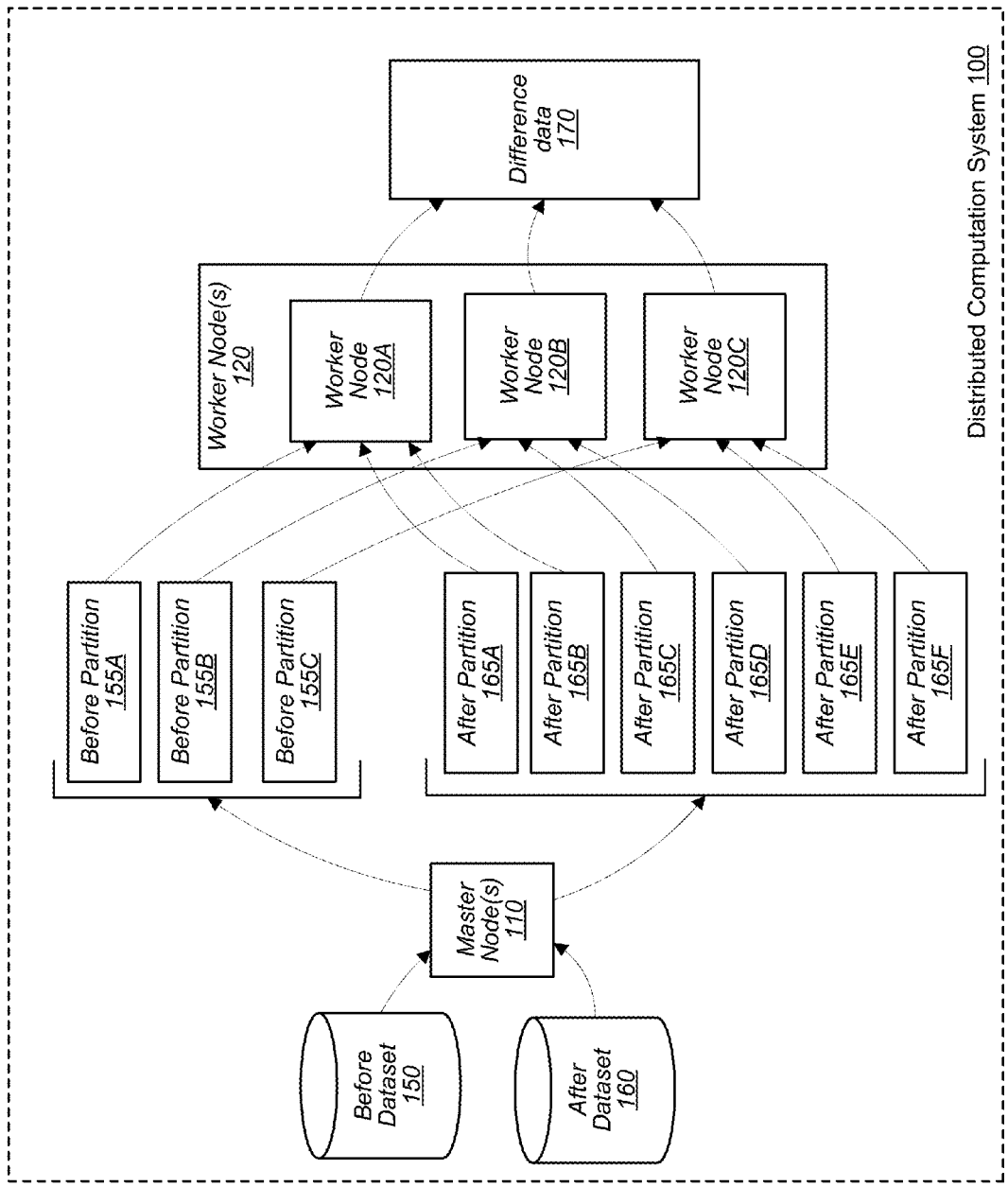
FIG. 3 is a block diagram illustrating one embodiment of assigning partitions to worker nodes when comparing two datasets having differing numbers of partitions.

FIG. 3 is a block diagram illustrating one embodiment of comparing two datasets with different number of partitions within a MapReduce process, as described herein. As noted above, a master node 110 may be configured to split before dataset 150 into multiple before partitions 155 and to split after dataset 160 into multiple after partitions 165. While described herein in terms of a before and after version of a database, before dataset 150 and after dataset 160 may represent any two datasets and not just different versions of the same database.

As shown in FIG. 3, master node 110 may split one of the datasets (e.g., after dataset 160) into a greater number of partitions than the other dataset. For example, after dataset 160 may be split into six partitions while before dataset may be split into three partitions. Datasets may be split into different numbers of partitions for any of various reasons, such as to achieve greater efficiency after the dataset has grown over time. Worker nodes 120, such as worker nodes 120A, 120B and 120C may be assigned to process (e.g., compare) the data in the partitions. Since one dataset may be split into a greater number of partitions than the other, each worker node may receive one partitions from one dataset and two or more partitions from the other dataset. For example, as shown in FIG. 2, after dataset 160 may be split into six partitions while before dataset 150 may be split into three partitions. Thus, worker node 120A may be assigned one partition from before dataset 150 (e.g., before partitions 155A) and two partitions from after dataset 160 (e.g., after partitions 165A and 165B).

A system to compare two databases using a MapReduce-based process may take advantage of certain features of the MapReduce process. For example, in some embodiments, the partitioning of the datasets may be consistent across different runs of the system and therefore the system may be able to use partitions that were actually created during a previous run of the system. For instance, in one embodiment, before dataset 150 may have been divided into before partitions 155 during a previous execution, such as when before dataset 150 was compared to another previous version of the database (not shown in FIG. 3). Additionally, consistent partitioning schemes may be utilized to ensure that partitions boundaries match between the partitioning of before dataset 150 and after dataset 160. For example, a similar hashing function may be used to partition both datasets, but may be used to create differing numbers of partitions. Thus, records included in a single before partition may be included in multiple after partitions, according to some embodiments. In other words the set of keys for records in the before partition may overlap the set of keys for records in multiple after partitions. While every key in the before partition may not be present in the after partitions, if a key is present in the after dataset, it will be present in one of the partitions corresponding to the before partition (e.g., as defined deterministically by the partitioning scheme).

Partitioning schemes (e.g., hashing functions) may be selected to ensure that no partition in after dataset 160 includes records with keys that are included in multiple before partitions, according to one embodiment. In other words, partitioning schemes may be selected that ensure that multiple partitions of the dataset with the greater number of partitions always align (e.g., according to the partitioning scheme) a single partition of the dataset with fewer partitions. As noted previously, a master node may include a split (or splitter) function configured to determine how to divide the datasets into partitions. In some embodiments, the splitter function may be configured to split a dataset into one or more partitions, each of which may include multiple records for a set of keys according to a particular partitioning scheme (e.g., a hash function). The same, or different, splitter functions (utilizing the same, similar or different partitioning schemes) may be used to divide different datasets, according to different embodiments. For example, in one embodiment, one splitter function may be used to divide before dataset 150 while another may be used to divide after dataset 160. While generally described herein as a separate function or module, in some embodiments, a splitter function may be part of, or utilized by, an input function (or module or class), as will be described in more detail below.

In some embodiments, two datasets may be compared when the datasets are split into different numbers of partitions. For instance, if a comparison is made between a current version of a database and a previous version of the database, the database may have grown in size so that additional partitions are needed for performance and/or memory reasons. For example, either additional records may have been added to the database or the data in existing records may have grown in size. Similarly, in some embodiments, the current dataset may be smaller than the previous dataset and therefore the later dataset may be split into a smaller number of partitions.

In some embodiments, both the previous and current datasets may be split into partitions when performing the comparison and therefore a larger number of partitions may be generated for both dataset. However, in some embodiments, the partitions used previously (e.g., the last time a comparison was performed) for the later dataset may be reused and compared to the partitions of the current dataset even though the current dataset may be split into a larger number of partitions (than the other dataset).

Thus, when performing a comparison using the MapReduce methodology, the two datasets may be split into partitions, but the one dataset may be split into fewer partitions than the other dataset. In some embodiments, whenever a dataset needs to be split into a different number of partitions than previously, the MapReduce process may be configured to split the larger dataset into a number of partitions that is a multiple of (e.g., two, three, four times) the number of partitions of the smaller dataset.

For example, FIG. 4 is a block diagram that illustrates a logical view of the partitioning of two datasets into differing number of partitions in a consistent and deterministic manner. For instance, in some embodiments, the MapReduce process may be configured to utilize a hash function (e.g., on the keys of a dataset) to split the dataset into a number of partitions, such as by hashing into a number of hash "buckets" equal to the number of final partitions. As shown in FIG. 4, before dataset 150 may be split using a hash function using 8 buckets (e.g., buckets 0-7). As illustrated by key hashes 400 of before dataset 150. While shown in FIG. 4 using an interleaved arrangement of buckets, other embodiments may use different patters or arrangements of hash buckets.

After dataset 160 may be divided into partitions according to the same (or a similar) hash function but using a different number of buckets. Thus, as shown in FIG. 4, key hashes 410 of after dataset 160 may be hashed using 16 buckets, only 10 of which are shown (e.g., buckets 0-10). As is apparent in FIG. 4, each of the buckets of before dataset 150 corresponds to two buckets of after dataset 160. For example, bucket 0 of before dataset 150 corresponds to bucket 0 and bucket 8 of after dataset 160. It should be noted that the numbering and arrangement of buckets in FIG. 4 is merely one example and that other embodiments may utilize different numbers, arrangements and/or correspondence of buckets between two datasets.

According to the partitioning schemes illustrated in FIG. 4, if a key of before dataset 150 is partitioned (e.g., hashed) into bucket 0, the corresponding key will be partitioned (e.g., hashed) into either bucket 0 or bucket 1 of after dataset 160. In some embodiments, the correspondence between buckets may be deterministic according to the partitioning scheme (e.g., hash function) used. Thus, by using a consistent partitioning scheme, such as a hash function, to partition both datasets, the MapReduce process may be configured to easily determine which partitions (e.g., buckets) in one dataset correspond to partitions of the other dataset. In other embodiments, other manners of determining the correspondence between partitions (e.g., other than deterministically based on the partitioning scheme) may be utilized. In general any method of determining which partitions of one dataset correspond to partitions in another dataset may be used with the methods and features described herein.

As noted above, in some embodiments, the MapReduce process may split one dataset into a number of partitions that is a multiple of (e.g., two, three, four times) the number of partitions of the other dataset. In other embodiments however, the number of partitions in one database may not be an even multiple of the other. In some embodiments, the two datasets may each be split into an arbitrary number of partitions.

Thus, individual worker nodes may be assigned multiple partitions for comparison. As shown in FIG. 3, worker node 120A may be assigned to compare before partition 155A to after partitions 165A and 165B, while worker node 120B may be assigned to compare before partition 155B to after partitions 165C and 165D. Similarly, worker node 120C may be assigned to compare before partition 155C to after partitions 165E and 165F. The particular arrangement of partitions assignments illustrated in FIG. 3 is for example and ease of explanation only. In other embodiments, other and differing partition assignments may be used. For example, in one embodiment, a worker node may be assigned multiple before partitions for comparison to corresponding after partitions. Thus, a single worker node may be assigned to compare before partitions 155A and 155B to after partitions 165A, 165B, 165C and 165D, according to one embodiment.

Figure 5:
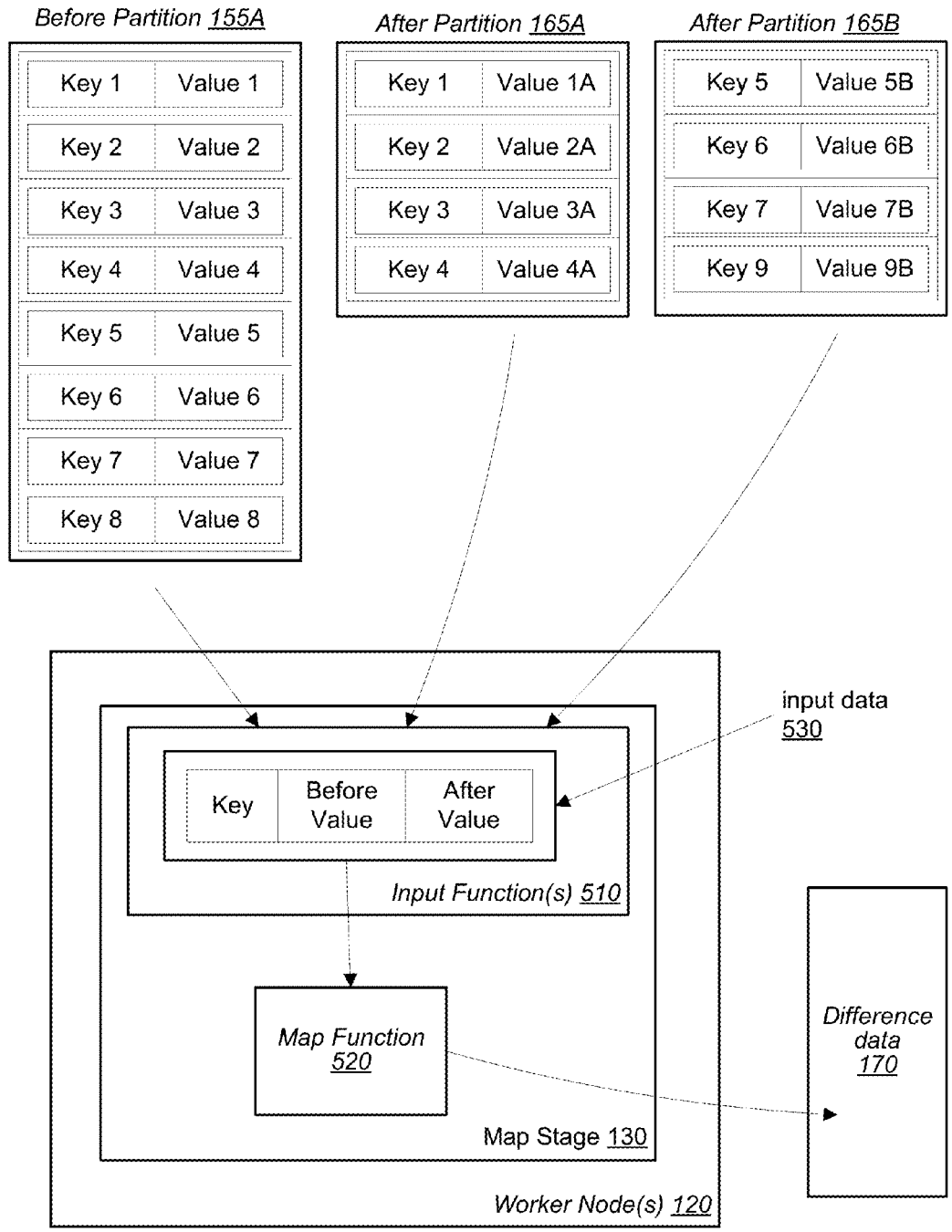
FIG. 5 is a block diagram illustrating, according to one embodiment, the comparison of records from datasets having differing numbers of partitions.

FIG. 5 is a block diagram illustrating a more detailed view of the processing of partitions from datasets that have been split into different numbers of partitions, according to one embodiment. A worker node 120 may utilize one or more functions within the MapReduce process when processing the partitions. For example, worker node 120 may utilize a custom input function 510 to read the records from the partitions and may use a different input function for each partition or for partitions from the different datasets. A worker node may also employ a map function of the MapReduce framework to perform the comparison between two individual records. Thus, as shown in FIG. 5, input function 510 may read, or cause to be read, a record from before partition 155A and a record from after partition 165A and/or 165B. The input function 510 may then pass the record data as input data 530 to the map function 520 for comparison.

Input function 510 may match up records from the before partition and after partitions based on the keys and the particular order used to the sort the records within the partition. For example, each record may include a key and value, as shown in FIG. 5 and input function 510 may read a record from before partition 155A that includes key 1 and may read a record from after partition 165A that also include key 1. Thus, key 1 and value 1 from before partition 155A may represent a key-value pair and key 1 and value 1A from after partition 165A may represent another key-value pair. Input function 510 may then build input data 530 to include the key and values (or the key-value pairs) from the two records and pass input data 530 to map function 520 for processing or other computation (e.g., comparison).

When reading records from the partitions, input function 510 may have to keep track of the current key and/or current records from each partition and utilize the consistent nature of the partitioning and the sorting within the partitions (e.g., according to the keys) to match up corresponding records from the different partitions. When comparing two databases using a MapReduce process, the sorting order of records within partitions may be used to aid in the determination of differences between the databases. If two partitions include similar records sorted according to the same key data, iterating through those records in both partitions may allow the comparison code to determine when a record has been deleted or added to the database.

When comparing two versions of a database looking for differences between the two versions, iterating through the records in sorted order may reveal that a record has been deleted between the two versions of the database. When iterating through the records, if the current record for a previous version of the database occurs before, according to the sort order, the current record in the later version of the database, it may be determined that a record was deleted, according to some embodiments. Similarly, if the current record for a previous version of the database occurs after, according to the sort order, the current record in the later version of the database, it may be determined that a record was added, in some embodiments. If the two current records are equal, according to the sort order, then the details of the records may be compared to determine if any difference exists between them.

For example, in one embodiment input function 510 may open three files, each containing one of the partitions illustrated in FIG. 5 and may iterate (e.g., step) through the records of the partitions in parallel using the key order to only advance the iteration in one of the after partitions (e.g., the after partition with the record that matches the record from the before partition). For example, input function 510 may read the first record from before partition 155A (e.g., key 1, value 1), read the first record from after partition 165A and read the first record from after partition 165B. Input function 510 may then determine that the record from after partition 165A precedes, in terms of the sort order, the record from after partition 165B. Input function 510 may then use the record from after partition 165A to compare with the record from before partition 155A, advance the iteration in both before partition 155A and after partition 165A, but without advancing the iteration in partition 165B. Input function 510 may then proceed to iterate through the records of before partition 155A and after partition 165A until all the records of after partition 165A have been used, after which input function 510 may begin to use record from after partition 165B.

At each iteration, input function 510 may build an input data 530 including the values from the corresponding records and pass input data 30 to map function 520 for comparison. For example, if a record for the key exists in both datasets, such as in before partition 155A and in after partition 165A, input function 510 may include the value for the key from each partition in input data 530. For instance, at the first iteration of the example data illustrated in FIG. 5, input function 510 may include key 1, as well as value 1 and value 1A in input data 530, according to one embodiment. If however, one of the datasets does not include a record for a particular key included in the other dataset (e.g., an addition or deletion occurred), then input function may include they key an a value for the key from one partition in input data 530, but may also include a special indicator that the other partition does not include a record corresponding to the key. For example, when processing key 8, input function 510 may include key 8 and value 8 from before partition 155A in input data 530, but may include a special value indicating that no after partition includes a record with key 8.

Map function 520 may compare the information regarding the two records to determine if any difference exists between the two records and may output information (e.g., a record) to difference data 170 indicating any determined difference.

Figure 6:
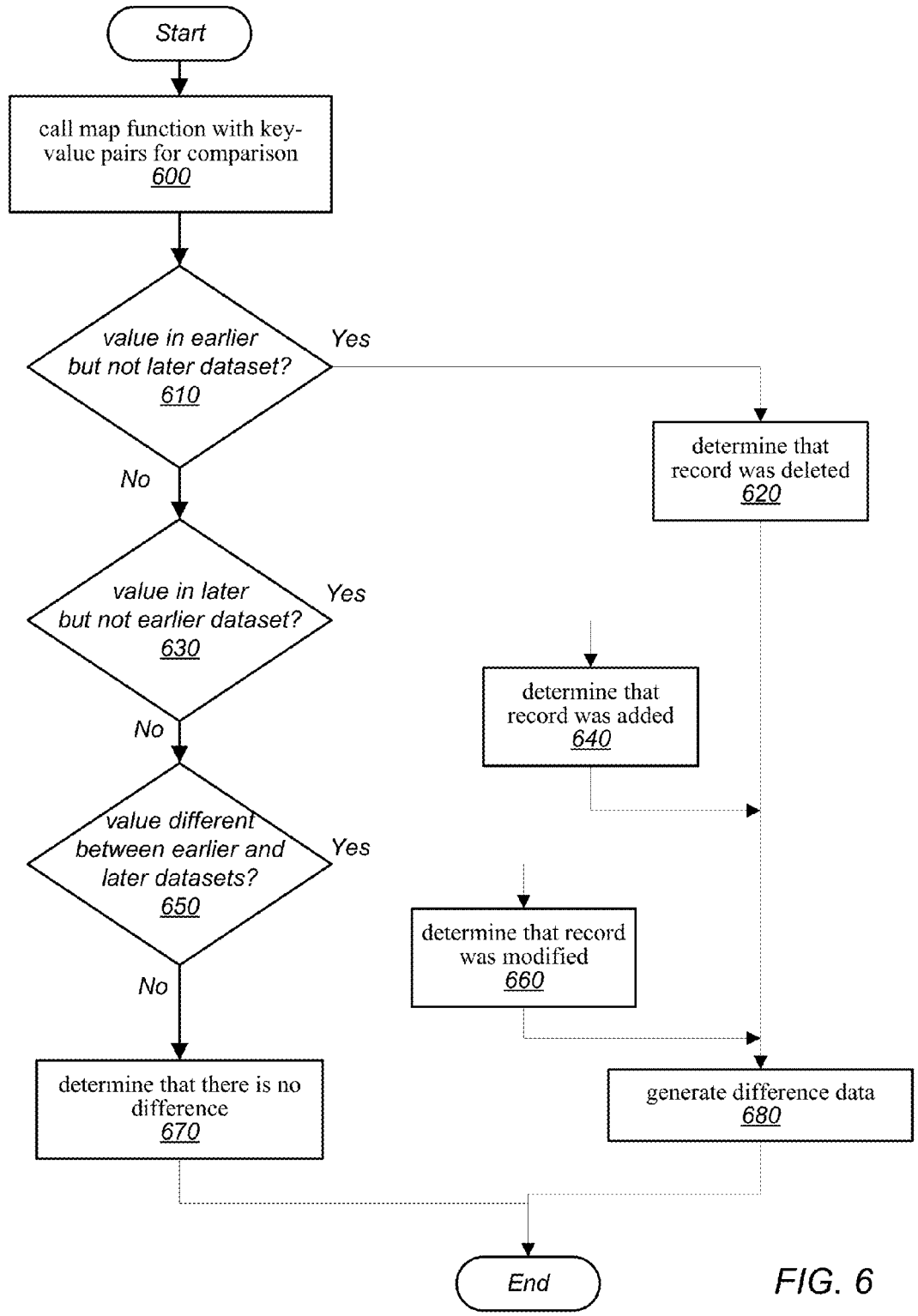
FIG. 6 is flowchart illustrating one embodiment of a method for determining differences between records of two datasets within a map function of a MapReduce process, as described herein.

FIG. 6 is flowchart illustrating one embodiment of a method for determining differences between two datasets within a map stage of a MapReduce process, as described herein. When comparing the two datasets using the MapReduce process a map function, such as map function 520, may be created that is called repeatedly to process records from the datasets being processes. The map function may be called with information from a single record from each dataset as input. For example, in one embodiment, the map function may receive a key and values corresponding to that key from each dataset (e.g., one value from each dataset). As shown in block 600 the map function may be called with key-value pairs for comparison. In some embodiments, the map function may receive as input a data structure, such as input data 530, which includes the key and the two values. In some embodiments, however, the input data from the records may be provided to the map function in any of various manners.

The map function may then compare the two values for the key to determine any differences between the values for that key between the two datasets. For example, as shown in decision block 610, if there is a value associated with the key in the earlier dataset but there is not a value associated with the key in the later dataset, the map function may determine that the record(s) related to that key was deleted from the data between the earlier and later datasets, as shown in block 620.

Similarly, if there is not a value associated with the key in the earlier dataset, but there is a value associated with the key in the later dataset as illustrated by the positive output of decision block 630, the map function may determine that the record(s) related to that key was added to the data between the earlier and later datasets, as shown in block 640.

Furthermore, if there is a value associated with the key in both datasets but the values are different between the two datasets as illustrated by the positive output of decision block 650, the map function may determine that the record related to that key was modified between the two datasets, as shown in block 660. Finally, if there is a value associated with the key in both the earlier and later datasets and the values are the same, the map function may determine that there is no difference between the records related to the key between the earlier and later datasets, as shown by block 670. In some embodiments, the map function may include information in the generated difference data indicating that no differences were determined between the two datasets for particular records or keys. In other embodiments, however, the map function may not generate any difference data regarding records or keys for which no differences were determined.

After determining that difference exists between the records associated with the current key and after determining the nature of the difference (e.g., an addition, a deletion or a modification), the map function may generate difference data (e.g., MapReduce intermediate data) indicating the difference discovered between the records of the two datasets, as shown in block 480. In some embodiments the map function may generate a new key-value record including the current key and information regarding the detected difference. For instance, the map function may generate difference data indicating whether the difference was an addition, a deletion or a modification. Additionally, the map function may generate difference data including some or all of the actual data that was changed, as shown in block 680. In other embodiments, the intermediate data generated by the map function may include some or all of the information from one or both of the values associated with the key from the two datasets. As noted above, in some embodiments, the map function may also include information in the generated difference data regarding records or keys for which no difference was determined.

In some embodiments, the data generated by the map function may be the only output from the overall MapReduce process. In other words, differences may be calculated between two datasets within a MapReduce framework using only a map stage without a subsequent reduce stage. In other embodiments however, the intermediate data may be used as input to one or more reduce functions in the reduce stage of the MapReduce methodology as called by the MapReduce framework, such as to apply additional processing of the generated difference data (e.g., summations, aggregations, etc.).

Returning now to FIG. 5, input function 510, may represent a custom version of an input function configured to override (or be used in place of) a default or generic input function from the MapReduce framework used to execute the MapReduce process. Additionally, while only a single input function 510 is illustrated in FIG. 5, in some embodiments multiple input functions may be used. For example, one input function may be configured to read before partitions 155 while another may be configured to read after partitions 165. Thus, a different version of input function 510 may be utilized to coordinate the reading of records from the multiple after partitions and match up records to the single before partition. As noted above, a splitter function may be used to divide up datasets into partitions. In some embodiments, an input function may perform the same function as a splitter function, since both features require similar knowledge regarding the record layout and other data format of the input data.

Strongly Typed Variables

In some embodiments, the custom MapReduce framework may be generated to allow the input data to the input function and/or the map function to be strongly typed, as opposed to requiring the use of source code reflection to determine and cast the input variables. For example, a generic MapReduce source code system may require a programmer to use Java reflection to determine the actual type of a variable (e.g., an input to a method or function), but the custom MapReduce framework may be configured to allow the programmer to use strongly typed variables.

Thus, rather than determining the type of an input variable via a class parameter which may be used to instantiate the format via reflection internally, as in the following code snippet:

```
class   MyUniformDiffFormat(   )   extends
   CompositeInputFormat<Text>{ } job.setInputFormat
   (MyUniformDiffFormat.class);
job.set(CompositeInputFormat.JOIN_EXPR, Compos-
   iteInputFormat.compose("outer", TextInputFormat.
   class, "path1", "path2"));
```

In some embodiments, the type of an input variable, such as to input function 510, may be created via real (e.g., standard) object instantiation, as in the following source code snippet:

```
class   MyUniformDiffFormat(   )   extends
   AbstractUniformDiffFileInputFormat<Text, Text,
   MyPairClass, TextInputFormat>{
   public MyUniformDiffFormat( ) {
      super(new MyPairClass( ), new TextInputFormat( ));
   }
}
job.setInputFormat(MyUniformDiffFormat.class);
job.set(FileInputFormat.INPUT_DIR, "path1,path2");
```

In some embodiments, providing the ability to utilize strong typing within a MapReduce framework may allow the use of generic type arguments or value parameters, which may not be usable within a generic MapReduce system requiring the use of reflection to determine types and formats.

Similarly the values supplied to the map function may also be strongly-typed. For example, instead of requiring the programmer to perform casting within the map function to obtain component values (e.g., from the record information being processed) and then refer to those components by index, as in the following example code snippet:

```
LongWritable    lwBefore=(LongWritable)(value.
   get( )[0]);
LongWritable lwAfter=(LongWritable)(value.get( )[1]);
```

The values supplied to the map function may be written as objects of a generic subclass and accessed within the map function using strongly typed variables as in the following example code snippet:

```
LongWritable lwBefore=value.getBefore( );
LongWritable lwAfter=value.getAfter( );
```

For ease of description, the above discussion assumes that every key found in before partition 155A is also found in either after partition 165A or after partition 165B. However, as shown in FIG. 5, that may not be the case. For instance, key 8 is found in before partition 155A but is not found in either after partition. When trying to match a record from one dataset that includes a key not found in a record in the other dataset, input function 510 may construct input data 530 in such a way as to indicate that fact to map function 520. For example, in one embodiment input function 510 may construct an input data that includes key 8 and value 8 from before partition 155A but that does not include a corresponding value from an after partition. Thus, input data 530 may include a before value but not an after value. Alternatively, if a record of an after partition includes a key not found in the before partition, input data 530 may include an after value but not a before value.

Map function 520 may then compare the records using the data in the input data 530. For example, map function may be configured to determine three types of differences, such as an addition different, a deletion difference, and a modification difference. When comparing the records shown in FIG. 5, map function 520 may, for example, determine that a deletion difference exists regarding key 8, since key 8 exists in before partition 155A, but does not exists in either after partition. Map function 520 may also determine that an addition difference exists regarding key 9, since key exists in after partition 165B, but does not exist in before partition 155A.

While FIG. 5 illustrates three partitions, namely one before partition and two after partitions, the relative numbers of partitions may vary from embodiment to embodiment. For example, in one embodiment, a first dataset may be divided into a number of partitions and a second dataset may be divided into three times that number of partitions. In some embodiments, it may be more efficient to have the relative number of partitions between the two dataset be related by an even multiple (e.g., one dataset has twice, three times, four times, etc. the number of partitions of the other dataset). It is contemplated that the techniques described herein may be used with virtually any relative number of partitions.

Figure 7:
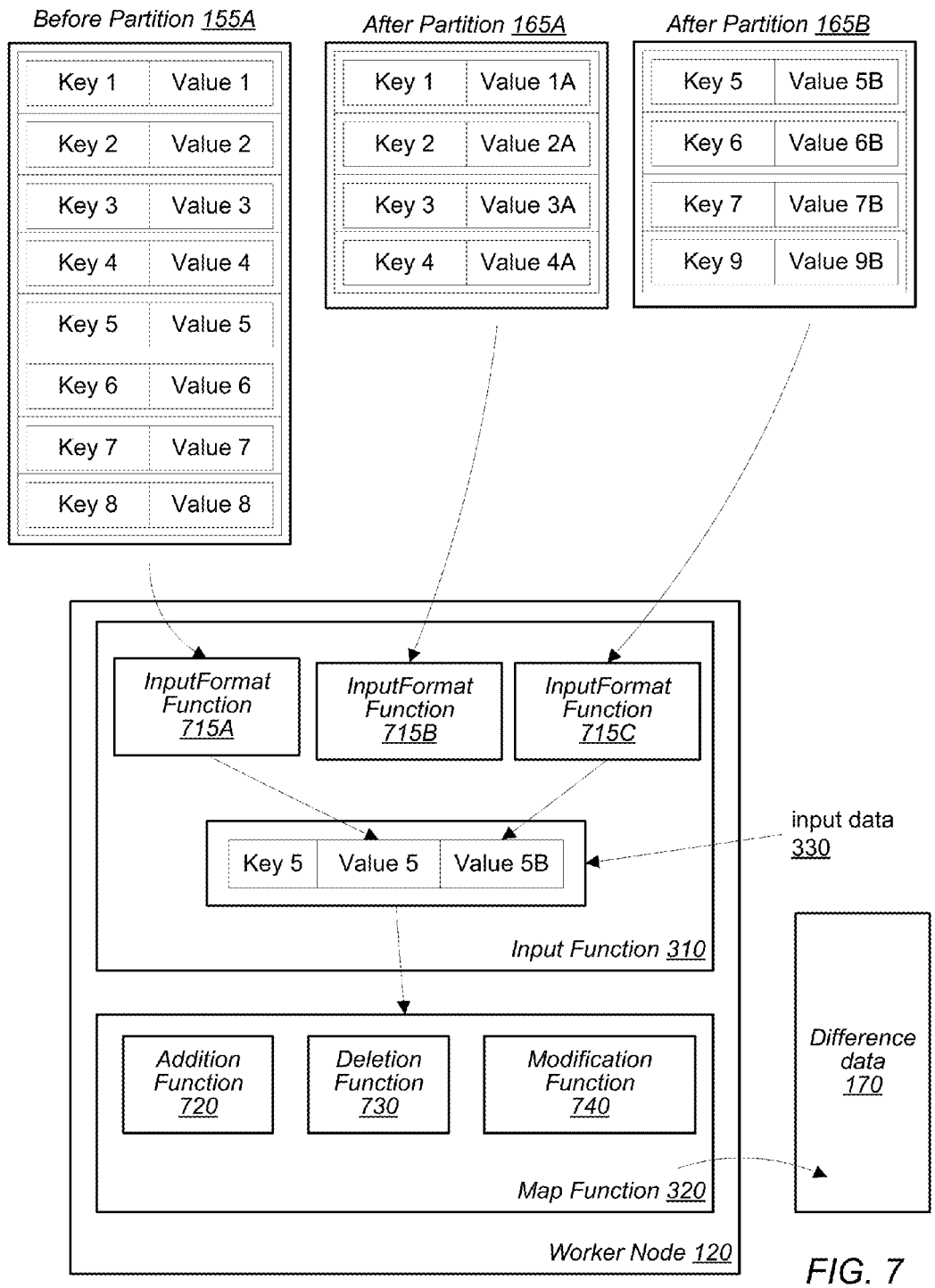
FIG. 7 is a block diagram illustrating one embodiment of using different input and map functions when comparing records from datasets having differing numbers of partitions.

While FIG. 5 illustrates a single input function responsible for reading all three (or more) partitions in some embodiments, additional input functions may be utilized. FIG. 7 illustrates one embodiments of a system in which worker node 120 includes additional input functions (e.g. inputFormat functions 715A, 715B and 715C) to read the partitions. According to some embodiments, custom input- Format functions may be used to describe the input-specification of data being processed within the MapReduce system. Additionally, a custom inputFormat function may read the records of the input file for processing by the map function. For instance, an inputFormat function may be responsible for determine the record boundaries within a partition and presenting a record-oriented view of the partition to map function. An inputFormat function may be implemented within a sub-class of a default input function provided by a generic MapReduce implementation, according to some embodiments.

In some embodiments, inputFormat function 715A, 715B and/or 715C may represent a function configured to override (or otherwise replace) a default or generic inputFormat function of a MapReduce framework. As described above regarding FIG. 5, worker node 120 may be assigned three partitions (before partition 155A, after partition 165A and after partition 165B) for processing (e.g., comparison). Worker node 120 may utilize input function 510 to load individual records from the partitions for comparison. In turn, input function 510 may utilize inputFormat functions 715A-715C to read the individual partitions. Thus, when iterating through the records of the partitions, inputFormat function 715A may read before partition 155A while inputFormat functions 715B and 715C may read after partitions 165A and 165B, respectively. In some embodiments, inputFormat functions 715B and 715C may coordinate the reading of records to ensure that the corresponding records are passed to map function 520 for comparison. In one embodiment, input function 510 may be configured to coordinate the reading of records by the individual inputFormat functions.

Similarly, map function 520 may also utilize multiple comparison functions (or in general, other processing functions) to compare the records from the two datasets. For example, in one embodiment, map function 520 may include, or access, custom functions written to verify, and/or generate output data, for different types of comparisons. As noted above, in some embodiments, three different types of differences may be discovered between records of the two datasets: addition, deletion and modification differences. Thus, map function 520 may be configured to utilize additional comparison functions, such as addition function 720, deletion function 730 and/or modification function 740.

In some embodiments, input function 510 may call map function 520 with the information from the two records (e.g., one record from each dataset) and map function 520 may then determine the nature of any difference between the two records and call one of the other comparison functions (possibly passing along the records as input). In other embodiments, however, worker node 120 may include multiple, specialized processing (e.g., comparison) functions, such as addition function 720, deletion function 730 and/or modification function 740, instead of (or in addition to) map function 520. Thus, input function 510 may determine the nature of any possible difference between the two records and call one of the appropriate processing functions (e.g., addition function 720, deletion function 730 and/or modification function 740) directly.

For example, in one embodiment, input function 510 may be configured to determine whether, for a particular key, a record exists in both datasets. If a record only exists in one of the datasets for a particular key, then input function 510 may determine that the difference between the two datasets is either an addition or a deletion and therefore may call an appropriate processing function (e.g., addition function 720 or deletion function 730, respectively). If, however, a record exists in both datasets, input function may call modification function 740, passing the record information as input. Modification function 740 may then compare the two records to determine if any difference exists between them.

While FIG. 7 illustrates addition function 720, deletion function 730 and modification function 740 within map function 320, in other embodiments, worker node 120 may include addition function 720, deletion function 730 and modification function 740 instead of map function 320.

In some embodiments, any specialized processing functions (e.g., addition function 720, deletion function 730 and/or modification function 740) may be configured to generate and/or output information regarding any determined differences as difference data 170. In other embodiments, however, specialized processing functions may return the difference information to map function 520 and map function 520 may then add the difference information to difference data 170 (e.g., as MapReduce intermediate data).

Illustrative Computer System

In at least some embodiments, a computer system that implements a portion or all of one or more of the technologies described herein, such as the distributed computation system 100, may include a general-purpose computer system that includes or is configured to access one or more computer-readable media.

Figure 8:
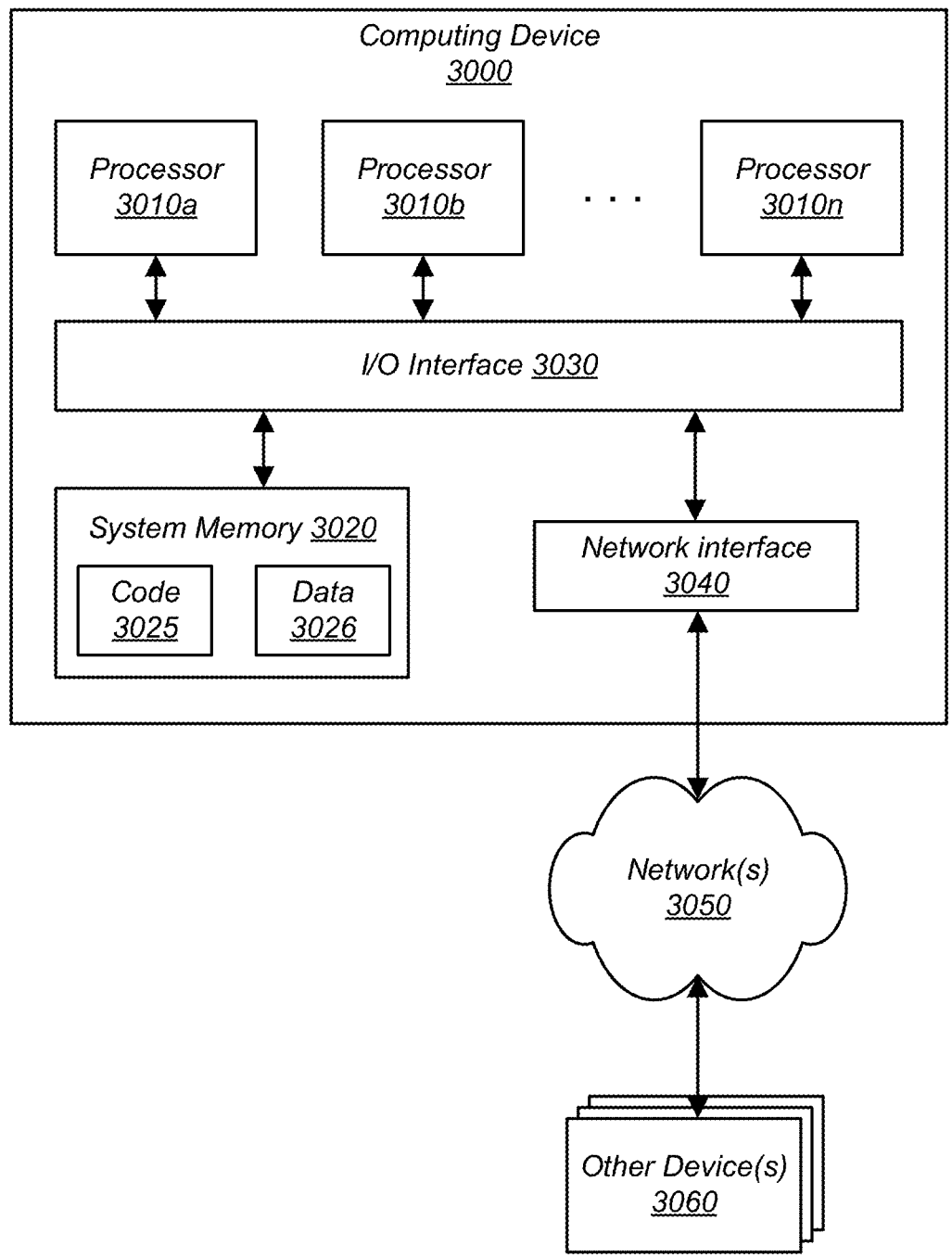
FIG. 8 is block diagram illustrating one embodiment of a computing device configured to implement calculating differences between two datasets having differing numbers of partitions within a distributed MapReduce computation system.

In at least some embodiments, a computer system that implements a portion or all of one or more of the technologies described herein may include a general-purpose computer system that includes or is configured to access one or more computer-readable media. FIG. 8 illustrates such a general-purpose computing device 3000. In the illustrated embodiment, computing device 3000 includes one or more processors 3010a-3010n coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010a and 3010b through 3010n (e.g., two, four, eight, or another suitable number), referred to collectively as processors 3010. Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory.

Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a plurality of computing devices configured to implement a distributed MapReduce computation system comprising:
one or more master nodes; and
one or more worker nodes;
wherein the one or more master nodes are configured to:
divide a current dataset into a plurality of current partitions; and
provide a respective one of one or more previous partitions of a previous dataset and two or more corresponding ones of the current partitions to individual ones of the worker nodes;
wherein one or more of the worker nodes are each configured to implement an input function and a map function of the MapReduce computation system;
wherein the input function is configured to:
iterate through records of the respective previous partition and of the corresponding current partitions; and
provide, at each iteration, information regarding a record of the respective previous partition and information regarding a matching record of one of the corresponding current partitions as input to the map function; and
wherein the map function is configured to perform a computation on the information regarding the matching records.

2. The system of claim 1, wherein the previous dataset and the current dataset represent two different versions of a database, wherein the previous dataset represents an earlier version of the database than the version represented by the current dataset.

3. The system of claim 1, wherein the previous dataset was previously divided, by the one or more master nodes, into the one or more previous partitions according to a previous partitioning scheme, wherein the one or more master nodes are further configured to:
divide the current dataset into the plurality of current partitions according to a current partitioning scheme; and
determine that the two or more corresponding ones of the current partitions correspond to the respective one of the previous partitions according to the previous partitioning scheme and the current partitioning scheme.

4. The system of claim 3, wherein the current partition scheme comprises applying a hash function to the current dataset, wherein the previous partitioning scheme comprises applying the same hash function to the previous database, and wherein the current partition scheme and previous partition scheme utilize differing numbers of hash buckets with the same hash function.

5. The system of claim 1, wherein the performed computation comprises a determination of whether any differences exist between the matching records.

6. A computer-implemented method for comparing two datasets in a MapReduce process, the method comprising:
  initiating, within a map stage of the MapReduce process, a map process on a first dataset and a second dataset, wherein the first dataset comprises one or more first partitions, wherein the second dataset comprises a plurality of second partitions, and wherein the second dataset comprises more partitions than the first dataset;
  wherein the map process comprises:
    determining, for a respective first partition, a plurality of corresponding second partitions that each comprise a set a keys overlapping a set of keys comprised in the respective first partition; and
    generating difference data indicating one or more differences between the respective first partition and the plurality of second partitions.

7. The method of claim 6, wherein each first partition and each second partition comprises a respective plurality of key-value pairs, wherein each key-value pair comprises a key and a value, wherein the key-value pairs in each first partition and in each second partition are sorted according to a same key sort order, and wherein said generating difference data comprises:
  iterating through the key-value pairs of the respective first partition and iterating through the key-value pairs of the plurality of corresponding second partitions, wherein the key-value pairs of the plurality of corresponding second partitions are iterated in sequence according to the key sort order; and
  wherein said generating difference data comprises comparing, at each iteration, a current key-value pair of the respective first partition to a current key-value pair from one of the plurality of corresponding second partitions.

8. The method of claim 7, wherein said generating difference data further comprises determining that the respective first partition comprises a key-value pair comprising the respective key and that none of the corresponding second partitions comprise a key-value pair comprising the respective key.

9. The method of claim 8, wherein said determining that the respective first partition comprises a key-value pair comprising the respective key and that none of the corresponding second partitions comprise a key-value pair comprising the respective key comprises:
  determining that the key for the current key-value pair of the respective first partition precedes, according to the key sort order, the key for the current key-value pair of the corresponding second partitions.

10. The method of claim 7, wherein said generating difference data comprises determining that one of the corresponding second partitions comprises a key-value pair comprising the respective key and that the respective first partitions does not comprise a key-value pair comprising the respective key.

11. The method of claim 10, wherein said determining that one of the corresponding second partitions comprises a key-value pair comprising the respective key and that the respective first partitions does not comprise a key-value pair comprising the respective key comprises:
  determining that the key for the current key-value pair of the respective first partition follows, according to the key sort order, the key for the current key-value pair of the corresponding second partitions.

12. The method of claim 7, wherein said generating difference data comprises determining that the respective first partition comprises a key-value pair comprising the respective key and one of the corresponding second partitions comprises a key-value pair comprising the respective key, wherein the values of the key-value pairs comprising the respective key from the two partitions differ.

13. The method of claim 6, wherein the plurality of second partitions comprises a number of partitions equal to an even multiple of a number of partitions in the one or more first partitions.

14. A non-transitory, computer-accessible storage medium comprising program instruction executable on one or more computers to implement a map stage of a MapReduce process on a first dataset and a second dataset, each comprising a plurality of records, wherein each record comprises a key and a value;
  wherein the program instructions for the MapReduce process are computer-executable to provide a splitter function, an input function and a map function, wherein the splitter function is configured to:
    split the first dataset into one or more first partitions each comprising a plurality of records for a set of keys according to a first partitioning scheme;
    split the second dataset into a plurality of second partitions each comprising a plurality of records for a set of keys according to a second partitioning scheme;
    wherein the second partitioning scheme causes the input function to split the second dataset into a greater number of second partitions and wherein the first partitioning scheme causes the input function to split the first dataset into a lesser number of first partitions;
  wherein the input function is configured to:
    determine a plurality of the second partitions corresponding to a respective first partition according to the first and second partitioning schemes; and
    provide, as input to the map function, individual keys and information regarding values for the key from the respective first partition and corresponding second partitions; and
  wherein the map function is configured to:
    generate difference data for the key based on the key and the information provided as input.

15. The non-transitory, computer-accessible storage medium of claim 14, wherein a combined set of keys in the plurality of second partitions overlaps a set of keys in the respective first partition.

16. The non-transitory, computer-accessible storage medium of claim 14, wherein said splitting the first dataset occurs during a first execution of the program instructions, and wherein said splitting the second dataset occurs during a subsequent execution of the program instructions.

17. The non-transitory, computer-accessible storage medium of claim 14, wherein the first partitioning scheme comprises a first hashing function and wherein the second partitioning scheme comprises a second hashing function.

18. The non-transitory, computer-accessible storage medium of claim 14, wherein the input function is further configured to:
- iterate through the records of the respective first partitions and each of the plurality of corresponding second partitions; and at each iteration:
  - determine, for a current record of the respective first partition, a corresponding record from one of the plurality of corresponding second partitions, based on the respective keys of the current record and the corresponding record; and
  - wherein the information provided as input to the map function comprises information regarding a value for the key from the current record and information regarding a value from the corresponding record.

19. The non-transitory, computer-accessible storage medium of claim 18, wherein said iterating further comprises, at each iteration:
- advancing the iteration of the respective first partition; and
- advancing the iteration of the corresponding second partition comprising the corresponding record without advancing the iteration of others of the plurality of corresponding second partitions.

20. The non-transitory, computer-accessible storage medium of claim 14, wherein the program instructions are further configured to implement the MapReduce process on a plurality of computing nodes, wherein the plurality of computing nodes comprises one or more master nodes and one or more worker nodes, wherein said splitting the first dataset, said splitting the second dataset and said determining a plurality of second partitions are performed on the one or more master nodes, and wherein said providing, said comparing and said generating are performed on individual ones of the worker nodes.

* * * * *